United States Patent
Socci et al.

(10) Patent No.: US 8,483,528 B2
(45) Date of Patent: *Jul. 9, 2013

(54) OPTICAL MODE TRANSFORMER, IN PARTICULAR FOR COUPLING AN OPTICAL FIBER AND A HIGH-INDEX CONTRAST WAVEGUIDE

(75) Inventors: Luciano Socci, Milan (IT); Lorenzo Bolla, Milan (IT); Paola Galli, Milan (IT); Marco Romagnoli, Milan (IT); Silvia Ghidini, Milan (IT)

(73) Assignee: Google Inc., Mountain View, CA (US)

( * ) Notice: Subject to any disclaimer, the term of this patent is extended or adjusted under 35 U.S.C. 154(b) by 459 days.

This patent is subject to a terminal disclaimer.

(21) Appl. No.: 12/919,591

(22) PCT Filed: Feb. 29, 2008

(86) PCT No.: PCT/EP2008/052494
§ 371 (c)(1),
(2), (4) Date: Oct. 19, 2010

(87) PCT Pub. No.: WO2009/106139
PCT Pub. Date: Sep. 3, 2009

(65) Prior Publication Data
US 2011/0026880 A1    Feb. 3, 2011

(51) Int. Cl.
*G02B 6/26* (2006.01)
*G02B 6/42* (2006.01)
*G02B 6/10* (2006.01)

(52) U.S. Cl.
USPC .............. 385/50; 385/28; 385/14; 385/30; 385/131

(58) Field of Classification Search
None
See application file for complete search history.

(56) References Cited

U.S. PATENT DOCUMENTS

| 6,633,705 B2 | 10/2003 | Ambrosy et al. |
| 6,697,551 B2 | 2/2004 | Lee et al. |

(Continued)

FOREIGN PATENT DOCUMENTS

| EP | 0545820 A1 | 6/1993 |
| WO | 2009106139 A1 | 9/2009 |

OTHER PUBLICATIONS

International Search Report and Written Opinion for PCT/EP2008/052494 on Jul. 10, 2008, 13 pages.

(Continued)

*Primary Examiner* — Tina Wong
(74) *Attorney, Agent, or Firm* — Honigman Miller Schwartz and Cohn LLP

(57) ABSTRACT

An optical mode transformer comprises a first waveguide including a first core, a first cladding and an end facet configured to be coupled to an optical fiber. A second waveguide comprises a second core and a second cladding, and is arranged with respect to the first waveguide so as to realize an evanescent optical coupling with the first waveguide. The second core comprises a tapered region, in at least a portion of which the evanescent coupling takes place.

The first core and the second core are separated by a gap. A first refractive index contrast of the first waveguide is less than a second refractive index contrast of the second waveguide.

20 Claims, 14 Drawing Sheets

U.S. PATENT DOCUMENTS

| | | | |
|---|---|---|---|
| 6,947,632 B2 * | 9/2005 | Fischer | 385/27 |
| 7,079,727 B1 * | 7/2006 | Little | 385/28 |
| 7,099,540 B2 | 8/2006 | Shimoda | |
| 7,167,606 B2 * | 1/2007 | Gunn et al. | 385/2 |
| 7,305,157 B2 * | 12/2007 | Ahn et al. | 385/14 |
| 7,317,853 B2 * | 1/2008 | Laurent-Lund et al. | 385/43 |
| 7,865,048 B2 * | 1/2011 | McCaughan et al. | 385/122 |
| 8,320,721 B2 * | 11/2012 | Cevini et al. | 385/28 |
| 2003/0053756 A1 * | 3/2003 | Lam et al. | 385/49 |
| 2005/0175287 A1 * | 8/2005 | Pan et al. | 385/43 |
| 2005/0185893 A1 | 8/2005 | Liu | |
| 2006/0285797 A1 | 12/2006 | Little | |
| 2007/0036500 A1 | 2/2007 | Suzuki et al. | |
| 2008/0101744 A1 * | 5/2008 | Keyser et al. | 385/12 |
| 2010/0040327 A1 * | 2/2010 | Deki et al. | 385/28 |
| 2011/0116741 A1 * | 5/2011 | Cevini et al. | 385/28 |

OTHER PUBLICATIONS

Roelkens et al., "Efficient Fiber to SOI Photonic Wire Coupler Fabricated Using Standard CMOS Technology," 2005 IEEE Annual Meeting Conference Proceedings, Sydney, Australia, Oct. 23, 2005, 2 pgs.

Van Thourhout et al, "Coupling Mechanisms for a Hetergeneous Silicon Nanowire Platform," Semiconductor Science and Technology, IOP, Bristol, GB, vol. 23, No. 6, Jun. 1, 2008, 10 pages.

Costa et al, "TE-TM Coupling of a Standard Fiber to a Si-Wire Waveguide," European Conference on Integrated Optics (ECIO), Copenhagen, Denmark, Apr. 25-27, 2007, 4 pgs.

* cited by examiner

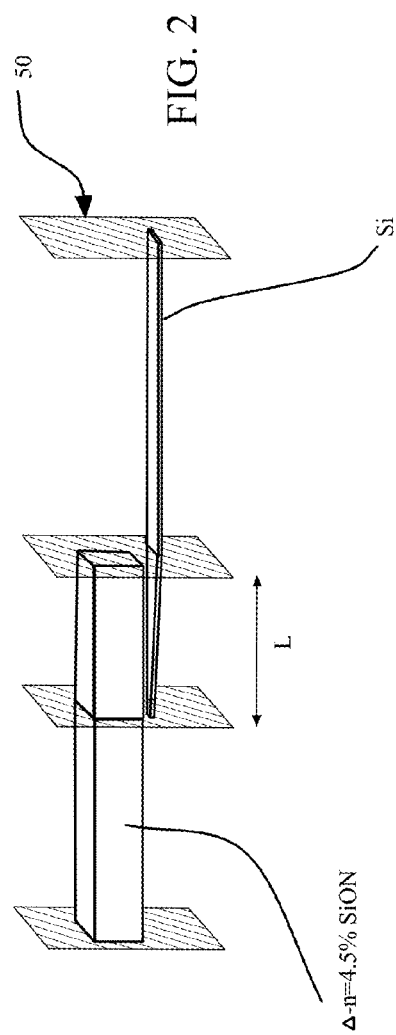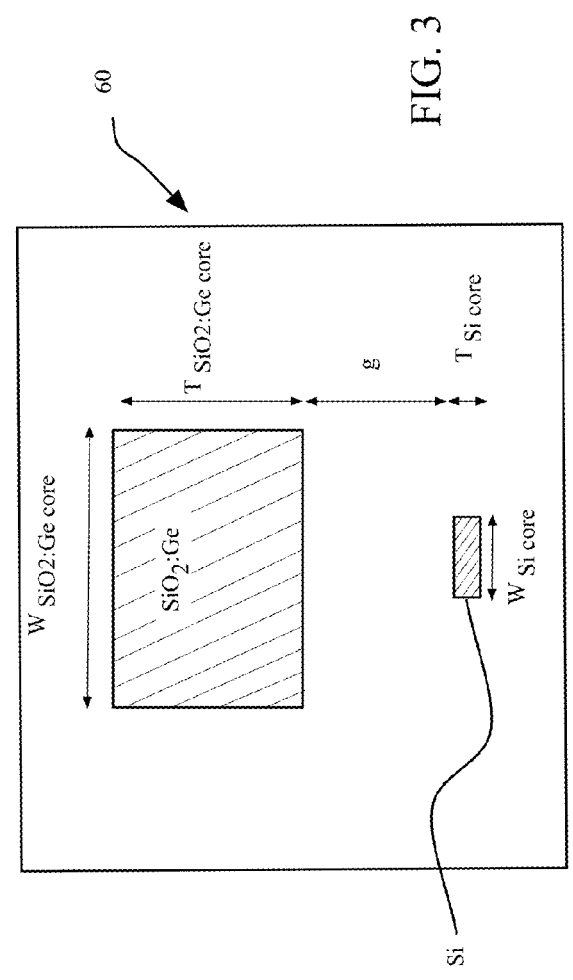

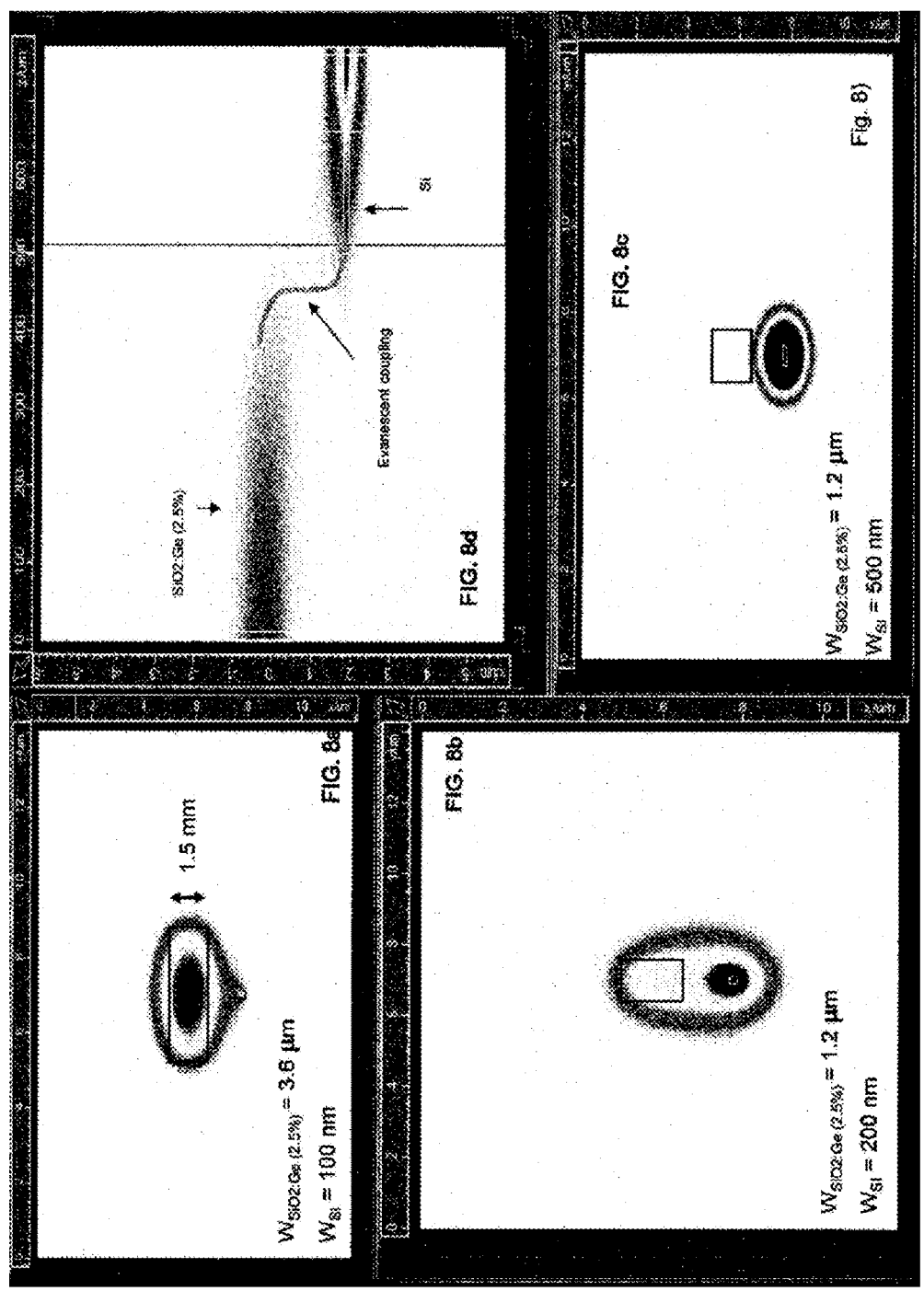

OPTICAL MODE TRANSFORMER, IN PARTICULAR FOR COUPLING AN OPTICAL FIBER AND A HIGH-INDEX CONTRAST WAVEGUIDE

TECHNICAL FIELD

The present invention relates to an optical mode transformer for efficiently coupling a single mode optical fiber to a high index contrast waveguide. In particular, the transformer of the invention is designed to minimize overall losses and to obtain low polarization depending losses and/or to minimize polarization mixing.

TECHNOLOGICAL BACKGROUND

The present invention relates to the field of semiconductor and dielectric optical components and devices used for optical transmission or optical digital data processing, in particular to the field of optical mode transformers between two waveguides.

One of the problems of the so called "Silicon Photonics" is the efficient coupling of high-contrast index waveguide, such as Si-waveguides, to the standard single mode optical fiber. Typically, a standard single-mode fiber has a mode field diameter comprised between 8 and 12 μm, more typically of 9-10 μm. The reason of the aforementioned problem lies in the difference in mode size, as well as in the refractive index, between the optical fiber and the Si waveguide.

The difference in mode size prevents to directly connect the single mode fiber to the high-index contrast waveguide, for example through a butt coupling, because the coupling can give rise to a high power loss, due to the difference in the mode size, the latter being typically of at least an order of magnitude.

The difference in refractive index causes a mode velocity difference between the waveguide and the fiber, resulting again in a high coupling loss when a direct coupling is performed.

To enable an efficient coupling between such different optical modes, optical mode converters, known also as optical mode transformers, are made in order to reshape the mode of the optical signal coming from the waveguide/optical fiber and to make its profile compatible with that of the mode guided in the optical fiber/waveguide in which the optical signal should be coupled. This mode matching should be done while preserving the performance characteristics of the optical device, e.g., by keeping the power losses caused by the optical coupling between the waveguide and the fiber below a certain reasonable level.

There have been several approaches to achieve efficient coupling between two different waveguides or waveguide/fiber with different refractive indices.

A known approach is to provide the high-index contrast waveguide with a taper.

U.S. Pat. No. 6,633,705 in the name of Alcatel discloses an optical module which contains at least one optical component whose optical input/output is directed towards an optical fiber to which it is to be coupled. At least one additional optical waveguide is arranged between this optical component and the optical fiber. The optical component is provided with an optical waveguide whose end, facing towards the optical fiber, is tapered or widened for a mode field adaptation. Additionally, the end of each interposed optical waveguide facing towards the optical fiber is also tapered or widened for a modal field adaptation.

US patent application n. 2006/0285797 describes an integrated optical mode transformer which provides a low loss interconnection between an optical fiber and an integrated optic waveguide having a spot size different from that of the fiber. The mode transformer is comprised of two waveguide layers, an upper layer and a lower layer. With the upper layer being contiguous to the lower layer. The lower layer is the integrated optic waveguide layer forming the optical circuit. The input dimension of the composite two-waveguide structure supports a fundamental mode that accepts all of the light present in the optical fiber. The upper waveguide layer is tapered down from an input width to an output width and then terminates in such a way that at the termination substantially all of the input optical power resides in the lower waveguide layer. The two-waveguide layer structure is fabricated by deposition and planarization techniques.

U.S. Pat. No. 6,697,551 in the name of the Massachusetts Institute of Technology is relative to a mode transformer that enables low-loss coupling between optical modes of two waveguides with different index difference. The mode size and effective index are gradually changed between two waveguides to gradually transform the mode shape, size and speed with minimum power loss. The mode transformer is useful for coupling the mode of an optical fiber waveguide with low index difference to the mode of a planar high index difference waveguide, and vice versa.

A different approach is disclosed in U.S. Pat. No. 7,099,540 in the name of NEC Corporation, where an optical coupling device is disclosed, having an optical waveguide varied in difference in specific refractive index between a clad layer and a core layer. The optical waveguide serves as a convergent/divergent spot size converter, since reduction in cross section of the core layer is not required for the convergent/divergent spot size converter so that the optical coupling device is produced at high production yield.

US patent application No. 2005/0185893 describes an apparatus and a method for reducing a mode size of an optical beam. In one embodiment of the described solution, the apparatus includes a first optical waveguide disposed in a first semiconductor material of a semiconductor layer. The first optical waveguide includes an inverted tapered inner core disposed in an untapered outer core of the first optical waveguide. The inverted tapered inner core includes a smaller end and a larger end. The apparatus further includes a second optical waveguide disposed in a second semiconductor material of the semiconductor layer. The second optical waveguide is a tapered optical waveguide having a larger end and a smaller end. The larger end of the second optical waveguide is disposed proximate to the larger end of the inverted tapered inner core of the first optical waveguide such that an optical beam is to be directed from the smaller end to the larger end of the first optical waveguide from the larger end to the smaller end of the second optical waveguide.

In "TE-TM coupling of a standard fiber to a Si-wire waveguide", written by Raffaella Costa et al., and published in the proceedings of the European Conference on Integrated Optics (ECIO), Copenhagen, Denmark, 25-27-Apr. 2007, light coupling from a small core fiber to a Si-wire waveguide is demonstrated for both TE and TM through a vertical coupler. A polarization independent coupling is said to be realized as a first trial with an efficiency of 72%. The small core fiber to Si-wire coupling is performed through an intermediate waveguide having a squared-shaped core with $\Delta n=4.5\%$ vertically coupled by means of a silicon taper. The Si-wire core is 220 nm thick.

SUMMARY OF THE INVENTION

The present invention relates to an optical mode transformer to efficiently couple an optical fiber to a high index contrast waveguide (HC waveguide). In particular, mode transformer of the present invention makes possible an efficient coupling of an HC waveguide to a standard single-mode fiber (in the following, shortly, SM fiber). The meaning of "high index contrast" will be better clarified below.

A main goal of the invention is to provide a mode transformer that enables a low-loss coupling between the SM fiber mode and the HC waveguide mode, e.g., with an optical loss between fiber and the HC waveguide of not more than 2 dB per facet, preferably not more than 1 dB per facet.

This transformer can be used, for example, to efficiently couple an optical mode from a standard fiber, whose typical single-mode dimension of the modal area is approximately 80 $\mu m^2$, to the mode in a HC planar waveguide, whose single modal area is typically equal or less than 1 $\mu m^2$, and vice versa.

The polarization of the optical signals coming from an optical fiber is generally random, so that, for many optical device applications, a mode transformer should preferably behave independently of the input polarization state or should not introduce a polarization dependency in the passing-through optical signals.

Another objective of the invention is to provide an optical mode transformer which is substantially polarization transparent, i.e., having low polarization depending losses and negligible polarization mixing. Polarization dependent loss is a measure of the peak-to-peak difference in transmission of an optical component or system with respect to all possible states of polarization of the propagating optical mode, i.e., it is the ratio of the maximum and the minimum transmission of an optical device with respect to all polarization states.

The optical mode transformer according to the present invention comprises semiconductor-based materials, for example III-V compounds or silicon-based materials, such as Si, $SiO_2$ (doped or undoped), SiON, $Si_3N_4$, etc.

Applicants have first considered a mode transformer 50 having the configuration schematically depicted in FIG. 2. A fiber is coupled to a high-contrast index waveguide, which is in this configuration a Si waveguide, through an intermediate SiON waveguide having a refractive index contrast, $\Delta n$, of 4.5%. The Si-waveguide is located under the intermediate waveguide at a vertical distance of 1.2 $\mu m$ and includes a core with thickness of 220 nm. The optical coupling between the two waveguides is an evanescent coupling.

Applicants have observed that in the transformer described with reference to FIG. 2, polarization mixing takes place. Single-mode optical fibers or single mode waveguides can support two polarization modes, which are referred to as TE (transverse electric) and TM (transverse magnetic) modes. Given an optical mode having a certain input state of polarization when entering the transformer, it is desired that the behaviour of the optical coupling to the high-index waveguides is the same regardless of the input polarization state. For instance, the signal that is transmitted across the optical fiber may be randomly polarized, i.e., it may have a random superposition of the two TE/TM polarizations. In this case, it is desired that the polarization states at the input of the mode transformer emerge substantially unaffected at the output of the coupling region. Within this meaning, the mode transformer should be "transparent" to the polarization states of the incoming optical signal. This is not the case in the transformer described with reference to FIG. 2. Applicants have observed that a TE input mode travelling in the intermediate waveguide may be transformed—at least partially—in a TM mode, or vice versa, when coupled to the Si waveguide. Due to this polarization mixing phenomenon, i.e., the fact that at least partial conversion of a polarization component directed along the TE(TM) direction into that directed along the TM(TE) direction is caused, polarization dependent losses are expected and, clearly, the input polarization is not preserved.

The graph of FIG. 5 reports experimental measurements of the polarization conversion efficiency, in a coupling structure 50 as that described with reference to FIG. 2, versus the Si taper length L of the coupling region.

The coupling efficiency of the TE mode, $\eta_{EM}$, and TM mode, $\eta_{ME}$, are defined as $$\eta_{EM}(L_t) = \frac{P_{TE}}{P_{TM} + P_{TE}}, \quad \eta_{ME}(L_t) = \frac{P_{TM}}{P_{TM} + P_{TE}},$$

where $P_{TE}$ and $P_{TM}$ are the optical powers at the output of the coupling region of the TE and TM polarization modes, respectively. From the two curves depicted in FIG. 5, one for $\eta_{EM}$ and the other for $\eta_{ME}$, it is clear that, depending on the Si taper length, polarization conversion takes place. The graphs show that at a taper length around 1500 $\mu m$, a strong polarization mixing takes place. The taper length at which the polarization mixing is maximum depends on several design parameters (e.g., the gap between the two waveguides, the height and/or width of the waveguides, and so on). The Applicant has observed that the control of the above listed parameters in such a way that the resulting taper length does not give rise to polarization mixing is a demanding task, especially when fabrication tolerances are to be taken into account.

Applicants have noted that coupling a Si-waveguide to a standard SM fiber using an intermediate waveguide having $\Delta n=4.5\%$ would lead to high optical losses, e.g., larger than 5 dB per facet, because the intermediate waveguide has a refractive index contrast $\Delta n$ which is too high to obtain an efficient coupling with a standard fiber. The definition of refractive index contrast, $\Delta n$, used in the present context is the following:

$$\Delta n = \frac{(n_{core})^2 - (n_{cladding})^2}{2(n_{core})^2}.$$

Applicants have recognised that a mode transformer including an intermediate (first) waveguide with a refractive index contrast $\Delta n_{intermediate\ waveguide}$ lower than 4.5% could in principle make possible to obtain reasonable losses in the coupling between the Si-waveguide and the standard SM fiber in a transformer 50 having the configuration depicted in FIG. 2. In more detail, Applicants have studied a mode transformer which couples a mode from/to a standard SM fiber to a standard $T_{Si\ core}=220$ nm thick Si waveguide having a tapered Si core with effective refractive index $n_{Si\ core}$ of 3.4756 corresponding to $\Delta n_{Si\ waveguide}=40\%$ and a cross-sectional area of 220 nm×488 nm ($W_{Si\ core} \times T_{Si\ core}$) in the guiding region at the output of the taper. Coupling occurs via an intermediate waveguide with a $SiO_2$:Ge core having $\Delta n_{intermediate\ waveguide}=2.5\%$ (n=1.483, 2.6 $\mu m \times 2.6$ $\mu m$ ($W_{SiO2:Ge\ core} \times T_{SiO2:Ge\ core}$)) and laying above the Si core. A cross sectional view of such a device 60 is sketched in FIG. 3, while its perspective view can be structurally similar to the transformer of FIG. 2, notwithstanding the difference in the refractive index contrast and in the material of the first waveguide core, as given above. The $SiO_2$:Ge core is evanescently coupled with the Si core, the coupling taking places in the coupling region that corresponds in this specific case to the vertically overlapping regions of the two waveguide cores, coupling region in which a taper in the Si core is formed. Two variants of the taper have been initially considered: a first taper having an initial (i.e., at the core end proximal to the intermediate waveguide) taper tip width, $W_{Si}$, of 50 nm and a second taper tip width of 100 nm, in both cases progressively enlarging to a Si core width dimension of 488 nm. The cladding of both Si and $SiO_2$:Ge cores is realized in the same material and the two cores are vertically separated by a gap of about 1 μm in a direction substantial perpendicular to the main longitudinal axes of the two waveguides.

Applicants have found that the transformer with an initial taper tip of 100 nm is not suitable for the desired applications because it exhibits low coupling efficiency due to optical mode mismatch.

The behaviour of the transformer with the second waveguide core having a tip width of 50 nm has been simulated, considering an input mode travelling in the first waveguide and then being coupled into the second waveguide. Some of the results are plotted in FIGS. 4a and 4b. In these graphs, the abscissa represents the length of the coupling region (which—in this case—substantially coincides with the length L in the longitudinal direction of the taper region) in microns, while the ordinate represents the normalized power transfer for both TE (FIG. 4a) and TM (FIG. 4b) polarizations. The curves for each graph represent the percentage of TE(TM) mode power coupled into the second waveguide core. As shown, the coupling between the two waveguides is not efficient: for lengths of the coupling region of 1 mm, a substantial fraction of mode power (about 50%) is left in the first waveguide and it has not been transferred into the second waveguide. In order to have complete transfer of the optical power into the second waveguide, lengths of the coupling region of at least about 2 mm are very likely needed. Therefore, in order to obtain a complete mode power transfer from the $SiO_2$:Ge core into the Si-waveguide core, an unacceptably long coupling region is required.

In addition, such a coupling structure requires very narrow tips, e.g., tips having a width of 50 nm, which remain nowadays a technologic challenge.

Applicants have realized that fundamental TE and TM modes travelling in a single mode waveguide have the same effective refractive index when the aspect ratio of the waveguide core (i.e., the ratio between its width and thickness) is equal or close to 1. Therefore, Applicants have realized that polarization mixing takes place across a waveguide region in which the core has a substantially square cross-sectional area. In that particular region of the waveguide core, the TE and TM modes guided therein degenerate, i.e., they experience the same effective refractive index. In the present case, a square or almost square cross sectional area has the following meaning: named L one of the sides of a waveguide rectangular cross sectional area, this area is considered to be square or almost square if the difference between the L side and all the other sides of the mentioned area is smaller than 0.2 L, more preferably smaller than 0.1 L.

Applicants have found that in a waveguide including a tapered core region, the optical mode should avoid as much as possible travelling along a core region having a square or almost square cross-sectional area in order to avoid degeneration of the polarization modes. In this area, due also to the unavoidable fabrication imperfections of the core design and core relative misalignments, degeneration of the TE/TM modes very likely can lead to polarization mixing due to the breaking of symmetry in the X-Y plane perpendicular to the propagating direction. Additionally, if polarization mixing takes place in a high index waveguide, wherein the TM and TE polarization modes experience a relatively high index difference, the optical mode becomes strongly affected by polarization—dependent losses and polarization mode dispersion.

Applicants have understood that the coupling region of the transformer should be designed so that the optical mode along the first waveguide is substantially transferred to the second waveguide in correspondence to a region of the second waveguide core beyond a square or almost square cross-section.

The optical mode transformer of the invention includes a first waveguide, comprising a first core and a first cladding. The first waveguide can support at least an optical mode, which is referred herebelow to as first mode. More preferably, the first waveguide supports at least an optical mode for each polarization state, i.e., at least one mode for the TE polarization, and at least one mode for the TM polarization. Additionally, the optical transformer of the invention comprises a second waveguide, from/to which the optical signal is to be coupled and which is in evanescent coupling with the first waveguide. The second waveguide comprises a core and a cladding, which will be accordingly named second core and second cladding, respectively. The second waveguide can support at least an optical mode, preferably at least a mode for each polarization state, i.e., at least one mode for the TE polarization, and at least one mode for the TM polarization, referred to as the second mode. The refractive index contrast of the first waveguide is smaller than that of the second waveguide.

The first and the second waveguides are positioned relative to each other in such a way that evanescent coupling is allowed from the first to the second waveguide or vice versa.

According to a first aspect, the mode transformer of the present invention includes a first waveguide and a second waveguide that has a refractive index contrast $\Delta n_2$ between the core and the cladding not smaller than 40% and a core thickness $T_2$ comprised between 120 nm and 180 nm.

In such a mode transformer, only a relatively small fraction of the mode power is transferred from the first to the second waveguide when the mode "experiences" the TE/TM degeneration in correspondence to the region of the second core comprising a square cross-section. Polarization scrambling is therefore substantially avoided.

The thickness range of 120 nm-180 nm allows to guide both TE/TM polarization modes while preserving the polarization status of the input optical signal. Thinner second cores, i.e., thinner than 120 nm, are generally less suitable because they guide the TM polarization mode less efficiently and thus relatively high polarization depending losses would result.

In the above identified ranges of thickness and refractive index contrast $\Delta n_2$ for the second waveguide, Applicants have also found that the mode transformer is extremely efficient and a substantially complete mode power transfer takes place within a "reasonable" taper length of the second waveguide core, which is preferably comprised between 100 μm and 3000 μm.

In the following, to simplify the present description, reference will be made to a coupling of a mode from the SM fiber to the second waveguide via the first waveguide. However, also a mode transformer performing mode coupling in the opposite direction, wherein a mode travelling in the second waveguide, coupled to the first waveguide and then outputted into the SM optical fiber, is encompassed by the invention.

A first propagating direction is defined, which is generally coincident or parallel to the main longitudinal axis of the first waveguide, and is the propagating direction of the first optical mode along the first waveguide.

In a preferred embodiment of the invention, the second and the first waveguides are disposed so that the latter is placed above the former. Preferably, the first core and second core are vertically arranged, i.e., lying in two planes arranged at a certain distance defined in a direction substantial perpendicular to the first propagating direction.

In a preferred embodiment, the main longitudinal direction of the second core is substantially parallel to the main longitudinal direction of the first core, so that the propagating direction of the second mode along the second waveguide, referred herebelow to as the second propagating direction, is parallel to the first propagating direction.

However, it is to be understood that other configurations may be envisaged, such as a configuration wherein the first and second waveguides are arranged with the respective cores substantially co-planar and disposed one adjacent to the other at a certain distance (or gap) in a common plane, said gap being perpendicular to the parallel propagating directions of the two waveguides.

Alternatively, the second waveguide is placed above the first waveguide, as long as the evanescent tail of the optical mode travelling in the first/second waveguide gives rise to a optical mode propagating in the second/first waveguide.

Therefore, the gap (g) between the first and the second waveguide herein indicates the distance between the first and the second core along a direction perpendicular to the first propagating direction. Preferably, such a distance is substantially constant across the overlapping region of the two waveguides.

The first waveguide is apt to be coupled with a standard single mode (SM) optical fiber, which can be placed externally from the mode transformer. For example, an end facet of the first waveguide may be butt-coupled to an end of the optical fiber. As alternative example, the SM fiber is pigtailed to the mode transformer, e.g., by gluing an end of the fiber to an end facet of the transformer, in correspondence to the core of the first waveguide.

Preferably, the SM optical fiber is brought up to the input of the first waveguide so that its main longitudinal axis lies parallel to the main longitudinal axis of the first waveguide of the mode transformer. Preferably, the SM fiber is laterally and vertically positioned so that the input end of the first waveguide can accept substantially the light from the fiber with relatively low optical loss. For example, the fiber is butt-coupled to the first waveguide with an alignment between the core of the fiber and the core of the first waveguide within +/−2 microns, preferably within +/−1 micron.

The evanescent coupling between the first and second waveguide takes place in a region of the optical mode transformer, referred in the following to as the coupling region, which comprises a portion of the first and of the second waveguide. In at least a portion of the coupling region and preferably in the whole coupling region, the second waveguide comprises a tapered portion which provides a gradual change of the effective refractive index, and thus which provides a mode transformation of the traversing optical signals. By gradually changing the effective refractive index of the second waveguide in the coupling region along the second propagating direction, the mode coupling can be achieved with high efficiency leading to a decrease of optical losses. Preferably, the tapered portion is structured such that an end of the second waveguide core proximal to the first waveguide has the smallest cross-sectional area (called tip of the tapered region), which then progressively enlarges till the desired guiding core dimensions.

According to a different embodiment of the invention, the tapered region does not include an end of the waveguide core. In this additional embodiment, from at least one end of the tapered region, the second waveguide core may extend, along a different direction at a given angle from the first propagating direction. According to a further embodiment, the second core may also extends parallel to the first waveguide core maintaining a constant cross sectional area equal to the tip cross sectional area. Advantageously, the tapered region realized in the second core is designed to minimize the polarization coupling between the different polarization modes of the propagating optical field in order to prevent polarization scrambling at the output of the mode transformer.

Preferably, the taper realized in the second waveguide is a linear taper. However, further or different optimisation of the taper profile may be envisaged within the scope of the present invention, such as an exponential or parabolic taper profile.

In a preferred embodiment of the invention, the first waveguide is positioned with respect to the second waveguide so that the two waveguide cores at least partially overlap across a region that is referred herebelow also as the overlapping region. Within the overlapping region the two waveguide cores are adjacent one another and most of the optical power transfer from one waveguide to the other by evanescent coupling takes place.

As mentioned, a gap is present between the two waveguides, i.e., the first and the second cores are not in contact but separated by a given distance g. A cladding layer for example may separate the two cores.

The initial second waveguide width (tip) is preferably comprised between 80 nm and 200 nm, more preferably between 100 nm and 150 nm, therefore preferably has values that are easily obtainable with standard fabrication processes.

Applicants have found that in the mode transformer realized according to the above teaching, lateral misalignments between the first and the second waveguide, i.e., lateral misalignments between the axes of the first and second waveguide cores perpendicular to their respective main longitudinal directions, up to a maximum value of (±2)µm, do not result in a significant performance degradation of the transformer for both the TE/TM polarizations of the optical modes.

Misalignments between the first and second waveguide core may be frequently present due to fabrication tolerances. In this case, or in cases of expressly desired misalignments, Applicants have found that some residual polarization coupling might happen in the coupling region between the first and second waveguide core. However, the design of the mode transformer of the invention is such that the polarization coupling occurs only in the first waveguide and in a relatively small amount. Moreover, when present, the polarization coupling is reversible: the same input polarization state will appear at the end of the mode transformer, thereby avoiding or reducing the polarization mixing.

In addition, the first and second waveguide core of the transformer of the invention can be separated by relatively large gaps, i.e., they may be separated by a distance up to few microns, as it will be better clarified below, without hindering the efficiency of the evanescent coupling.

Preferably, the second core of the second waveguide is realized in a material having a refractive index $n_{second\ core} > 3$. Preferred materials are for example Si, InP, AlGaAs, SiGe, Ge.

Preferably, in the first aspect of the invention, the width of the second core at the end of the tapered region, i.e., the guiding width of the second core, is comprised between 0.25 µm and 1.5 µm.

Preferably, the first waveguide has a refractive index contrast percent $\Delta n_1 = (3.4 \pm 1.4)$ %.

According to a second aspect of the present invention, a mode transformer having a configuration substantially identical to the one above described comprises a second waveguide having $18\% < \Delta n_2 < 30\%$ and a second core thickness $T_2$ comprised between 100 nm and 400 nm.

In mode coupling between the first and second waveguide, the lower is the refractive index contrast between the two waveguides, the slower is the mode transfer from the first to the second waveguide. In case of $18\% < \Delta n_2 < 30\%$, a thicker second waveguide core than in the case of $\Delta n_2 > 40\%$ can be thus envisaged without the risk of polarization scrambling. In the transformer according to the second aspect of the invention, the taper region realized in the second waveguide core has still a portion including a square cross section which may be located at a distance from the tip which is longer than in the transformer according to the first aspect of the invention due to the increased thickness. However, since the transfer of the mode is "slower" than in the case of $\Delta n_2 > 40\%$ for the second waveguide, the TM/TE polarizations degenerate when only a small fraction of the mode is travelling in the second waveguide while most of the mode power is still guided in the first waveguide.

Applicants have found that also in the transformer realized according to the second aspect, misalignments between the first and the second waveguide cores, up to a maximum of $(\pm 2)$µm, do not result in significant performance degradation for both the TE/TM polarizations.

Preferably, the second core of the second waveguide of the transformer realized according to the second aspect of the invention is realized in a material having a refractive index $1.8 < n_{second\ core} < 2.4$. Preferred materials for the second core of the transformer of this second aspect are for example wide—bandgap semiconductor as $Si_3N_4$, silicon-enriched nitride (SiN), etc.

Preferably, in the second aspect of the invention, the width of the second core at the end of the tapered region, i.e., the guiding width of the second core, is comprised between 0.3 µm and 3.0 µm.

Preferably, the first waveguide has a refractive index contrast percent $\Delta n_1 = (2.1 \pm 1.8)$ %.

The refractive index contrast, $\Delta n_1$, of the first waveguide is smaller than the refractive index contrast of the second waveguide, $\Delta n_2$.

In the following, to avoid any possible risk of confusion, the transformer according to the first aspect of the invention including a second waveguide having $\Delta n_2 > 40\%$ and a second core thickness comprised between 120 nm and 180 nm is called "first transformer of the invention", while the transformer according to the second aspect of the invention including a second waveguide having $18\% < \Delta_2 < 30\%$ and a second core thickness comprised between 100 nm and 400 nm is called "second transformer of the invention". The usage of the term "transformer" without additional specifications means that the sentence in which the term is used applies to mode transformers according to both the first and the second aspects of the invention.

The first waveguide of the transformer of the invention is preferably realized in a material having a refractive index which is the best compromise to obtain a low loss coupling with the standard SM fiber and at the same time an efficient coupling with the second waveguide.

Transformers wherein the first waveguide has a refraction index included in the respective preferred ranges with reference to the two aspects of the present invention, show losses when coupled to a SM standard fiber lower than 2 dB per facet.

Preferably, the thickness $T_1$ of the first waveguide core of the first transformer of the invention is comprised between 0.5 µm and 4 µm, while $T_1$ is comprised between 0.5 µm and 6 µm in the second transformer of the invention.

To obtain losses even lower than 2 dB per facet, in particular not larger than 1 dB per facet, the refractive index contrast, $\Delta n_1$, of the first waveguide and the first core thickness $T_1$ are preferably comprised within narrower ranges.

More specifically, in the first transformer of the invention the value of $\Delta n_1$ of the first waveguide is comprised between $\Delta n_1 = (2.6 \pm 0.6)$ %, according to a first embodiment. According to a second embodiment of the first transformer, the value of $\Delta n_1$ is $(4.0 \pm 0.8)$ %.

According to a preferred embodiment of the first aspect of the present invention, the first core thickness $T_1$ is comprised between 1 µm and 4 µm if $\Delta n_1 = (2.6 \pm 0.6)$ %, and $T_1$ is comprised between 0.5 µm and 1.0 µm if $\Delta n_1$ is $(4.0 \pm 0.8)\%$.

According to a first embodiment of the second aspect of the invention, the value of $\Delta n_1$ of the first waveguide is comprised between $\Delta n_1 = (1.6 \pm 1.3)\%$ According to a second embodiment, the value of $\Delta n_1$ of the first waveguide is in the range $\Delta n_1 = (3.3 \pm 0.4)$ %.

Preferably, the first core thickness $T_1$ is between 1 µm and 6 µm if $\Delta n_1 = (1.6 \pm 1.3)$ % and between 0.5 µm and 1 µm, if $\Delta n_1 = (3.3 \pm 0.4)$ %.

Preferred materials for the first waveguide core are for example SiON or germanium-doped $SiO_2$ ($SiO_2$:Ge).

Preferably, the first waveguide comprises a tapered region. In particular, the tapered region realized in the first waveguide and the tapered region realized in the second waveguide are preferably tapered in opposite directions, i.e., a mode travelling in the first waveguide along the coupling direction encounters a convergent region (a region of continuously reduced lateral cross section) along the first waveguide and a divergent region (a region of continuously enlarged lateral cross section) in the second waveguide.

A transformer configuration comprising a first and a second waveguide core, each including a tapered region, wherein the two regions are tapered in the same direction, could also be envisaged. This particular taper profile may be used whenever there might be the need to keep the TE/TM coupling regions spatially separated, i.e., when is desired that the TE mode couple before/after the TM one along the propagating direction.

The tapered region in the first waveguide may be followed by an additional region having constant cross section.

Preferably, the gap g present between the core of the first waveguide and the core of the second waveguide is comprised between 0.1 µm and 3 µm in the first transformer of the invention and between 0.1 µm and 5 µm in the second transformer of the invention.

The value of the gap selected for a specific transformer depends, among others, on the width of the taper tip of the tapered region realized in the second waveguide core, e.g., typically the wider the tip, the larger the gap in order to avoid losses due to mode mismatch.

BRIEF DESCRIPTION OF THE DRAWINGS

Further features and advantages of an optical mode transformer according to the present invention will become more clear from the following detailed description thereof, given with reference to the accompanying drawings, where:

FIG. 2 is a schematic perspective view of a mode transformer not according to the invention;

FIG. 3 is a cross sectional lateral view of an additional mode transformer not according to the invention;

FIGS. 8a-8d are simulations of the behaviour of a TM mode travelling in the transformer of FIG. 1;

PREFERRED EMBODIMENTS OF THE INVENTION

Figure 1:
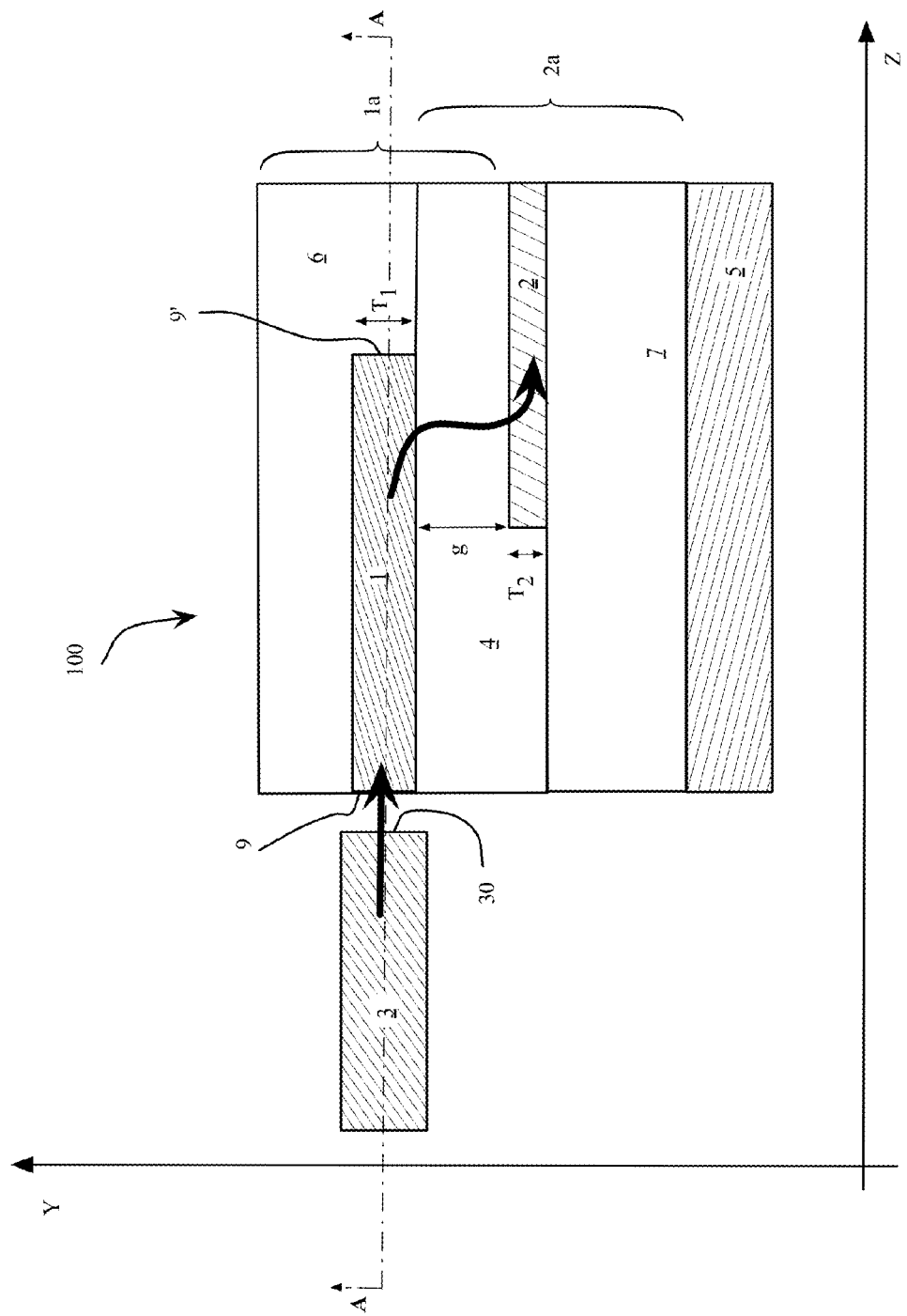
FIG. 1 is a schematic longitudinal view of an embodiment of the optical mode transformer of the invention.

With initial reference to FIG. 1, a mode transformer according to the teaching of the present invention is globally indicated with 100.

The mode transformer 100 comprises a first waveguide 1a vertically arranged on a second waveguide 2a. The first waveguide 1a, a facet 9 of which forms the input/output of the mode transformer 100, is apt to be coupled to an external SM fiber 3 in alignment with the first waveguide.

Preferably, the main longitudinal directions of the second and first waveguide are parallel to each other and parallel to the main longitudinal direction of the SM fiber. This common direction is conventionally indicated with axis Z in FIG. 1. The Z-axis also defines the main propagating direction of a signal travelling within the waveguides.

The second waveguide 2a comprises a core 2 (second core in the following). According to a preferred embodiment of the invention, the second core 2 is disposed on a lower cladding layer 7. The lower cladding layer 7 can be arranged on a substrate 5. An upper cladding layer 4 is disposed on the second core 2. The lower cladding layer 7 and the upper cladding layer 4 surround the core 2 and define the second cladding of the second waveguide.

The first waveguide 1a is realized on cladding layer 4 and comprises a first core 1, which is covered by an upper cladding layer 6. The cladding layers 4 and 6 surround the core 1 and define the first cladding of the first waveguide.

In the embodiment depicted in FIG. 1, the upper cladding layer 4 of the second waveguide core 2 is the lower cladding layer for the first waveguide core 1.

The second waveguide 2a is a high index contrast HC waveguide and, according to a first aspect of the invention, its $\Delta n_2$ is greater than 40%. Additionally, according to the same first aspect of the invention, the thickness $T_2$ of the second core 2 is comprised between 120 nm and 180 nm. Preferably, the second core 2 of the second waveguide is realized in a material having a refractive index $n_{second\ core}>3$, more preferably $n_{second\ core}>3.2$. Preferred materials are for example Si, InP, AlGaAs, SiGe, Ge more preferably Si.

Preferably, the first and the second waveguide are formed on a common silicon-on-insulator (501) structure. Preferably, the second waveguide core 2 is formed in the Si upper layer of the 501 structure where the buffer layer, e.g. made of $SiO_2$, is the lower cladding 7 formed on a Si substrate 5.

The modes which are guided from the SM fiber into the first waveguide 1a are "spread out" modes, i.e., because of their relatively large mode diameter due to the fact that they have to be coupled to the optical fiber, the mode size of travelling modes along the fiber being generally of 10 μm diameter. In order to avoid optical leakage, it is preferred that, if the substrate 5 is made of a material having a high refractive index, such as silicon, the buffer layer 7 arranged on the Si wafer has a thickness of more than 3 μm, more preferably not less than 15 μm.

According to a second aspect of the invention, the second waveguide 2a has a refractive index $\Delta n_2$ comprised between 18% and 30% and a second core 2 thickness $T_2$ comprised between 100 nm and 400 nm. Preferably, the second core 2 of the second waveguide 2a is realized in a material having a refractive index $1.8<n_{second\ core}<2.4$. Preferred materials for the second core 2 of the transformer 100 according to this second aspect of the invention are for example wide-bandgap semiconductors such as $Si_3N_4$, SiN, etc.

As mentioned above, the first waveguide 1a, through its end 9, is apt to be coupled to the SM fiber 3, schematically shown in FIG. 1. A possible coupling between the end facet 9 of the waveguide 1 and the fiber 3 is butt-coupling to an end facet 30 of the optical fiber. As alternative example, the coupling of the SM fiber is obtained via a fiber pigtail (not shown) to the mode transformer 100.

Preferably, the upper cladding 4 of the second waveguide core 2 and the upper cladding layer 6 of the first waveguide core 1 are realized in the same material. The material in which the common cladding is realized has a refraction index lower than both the refraction indices of the cores 1, 2 of the first and of the second waveguide 1a, 2a, respectively.

As visible in FIG. 1, considering the Z axis as the abscissa of the figure, for a given interval extending along the Z axis, the two waveguide cores 1, 2 extend one above the other (i.e., they overlap) at a mutual distance g along a vertical Y axis, perpendicular to the Z axis. According to an embodiment, the gap g remains constant for all the overlapping region in the given interval along the Z axis. The overlapping region along the Z-axis in which the waveguide cores are placed one on top of the other includes the coupling region wherein the two waveguides are optically coupled. Within the overlapping region along the Z-axis, the evanescent coupling of the mode travelling from/to the first waveguide to/from the second waveguide takes place.

This distance, or gap g, is preferably comprised between 0.1 µm and 3 µm in the transformer according to the first aspect of the invention and between 0.1 µm and 5 µm in the transformer according to the second aspect of the invention.

The refractive index $\Delta n_1$ and the thickness $T_1$ of the first waveguide 1a are preferably chosen according to the table 1 written below

TABLE 1

| Second waveguide | First waveguide |
| --- | --- |
| Transformer according to the first aspect of the invention (first transformer) $\Delta n_2 > 40\%$, 120 nm $\leq T_2 \leq$ 180 nm $n_{second\ core} > 3$ | $\Delta n_1 = (3.4 \pm 1.4)\%$ 0.5 µm $\leq T_1 \leq$ 4 µm $n_{first\ core} = 1.495 \pm 0.025$ |
| Transformer according to the second aspect of the invention (second transformer) $18\% < \Delta n_2 < 30\%$, 100 nm $\leq T_2 \leq$ 400 nm $1.8 < n_{second\ core} < 2.4$ | $\Delta n_1 = (2.1 \pm 1.8)\%$ 0.5 µm $\leq T_1 \leq$ 6 µm $n_{first\ core} = 1.48 \pm 0.03$ |

Transformers according either to the first or the second aspect of the invention, wherein the first waveguide has a refraction index contrast included in the preferred ranges of table 1, show optical losses lower than 2 dB per facet, when coupled to a SM standard fiber 3.

Table 1 also indicates preferred range values for the refractive index $n_1$ of the first core 1. Possible materials in which the first core 1 is realized are for example $SiO_2$:Ge or SiON.

More preferred ranges for the first waveguide 1a refractive index and thickness are listed in table 2. Transformers 100 according either to the first or of the second aspect of the invention wherein the first waveguide has a refractive index contrast $\Delta n_1$ and a core thickness $T_1$ included in the below listed ranges of Table 2 exhibit optical losses below 1 dB for facet.

TABLE 2

| Second waveguide | First waveguide |
| --- | --- |
| First transformer $\Delta n_2 > 40\%$, 120 nm $\leq T_2 \leq$ 180 nm $n_{second\ core} > 3$ | $\Delta n_1 = (2.6 \pm 0.6)\%$ 1 µm $\leq T_1 \leq$ 4 µm $n_{first\ core} = 1.485 \pm 0.010$ $\Delta n_1 = (4.0 \pm 0.8)\%$ 0.5 µm $\leq T_1 \leq$ 1 µm $n_{first\ core} = 1.510 \pm 0.010$ |
| Second transformer $18\% < \Delta n_2 < 30\%$, 100 nm $\leq T_2 \leq$ 400 nm $1.8 < n_{second\ core} < 2.4$ | $\Delta n_1 = (1.6 \pm 1.3)\%$ 1 µm $\leq T_1 \leq$ 6 µm $n_{first\ core} = 1.47 \pm 0.02$ $\Delta n_1 = (3.3 \pm 0.4)\%$ 0.5 µm $\leq T_1 \leq$ 1 µm $n_{first\ core} = 1.510 \pm 0.005$ |

Figure 6:
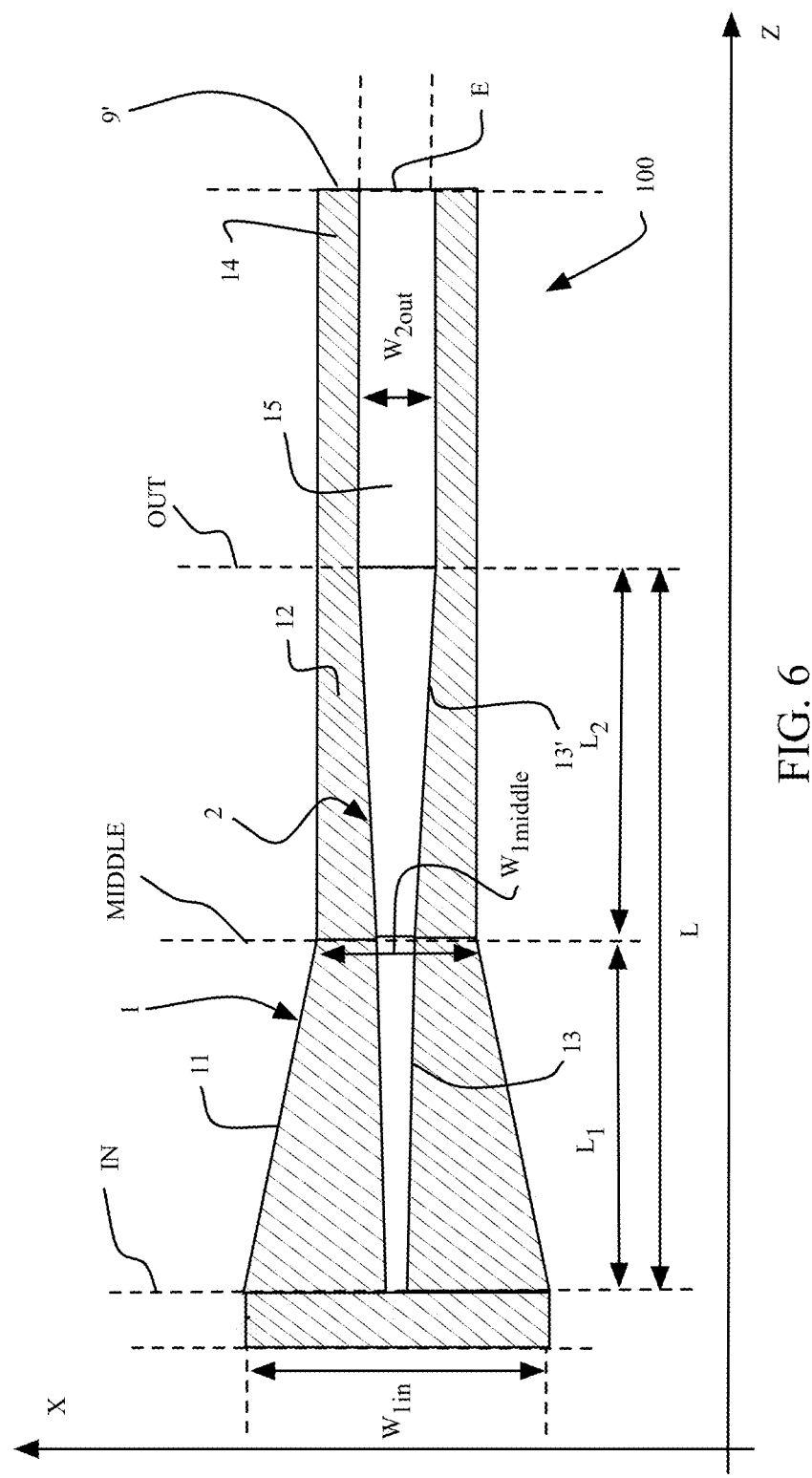
FIG. 6 is a partial top view taken along the line AA of the transformer of FIG. 1

With reference now to FIG. 6, a partial top view in a (X,Z) plane of the above mentioned Z interval is depicted in an enlarged scale, i.e., a top view of a portion of the transformer 100 including the region in which the two waveguides are in evanescent coupling is shown, taken along the AA line of FIG. 1. In the figure, both cores 1,2 are visible for clarity purposes, however it is to be understood that only the first core would be visible, the second core being hidden below the first core 1 and the cladding layers 6 and 4.

On this top view of the transformer 100, the first waveguide core 1 overlaps the second waveguide core 2 for all ordinates of a Z-interval delimited by an axis indicated with "IN" and an axis indicated with "E" depicted in the figure. At the two ends of the overlapping interval, only the second (on the right of the figure) or only the first waveguide core (on the left of the figure) extends.

An overlapping region is thus defined, which extends in FIG. 6 from the mentioned "IN" axis to the "E" axis at the end facet 9' of the first waveguide core. In this example, the overlapping region includes the coupling region of the transformer, where the evanescent coupling takes place.

In the following, reference will be made to a mode travelling from the first waveguide 1a down to the second waveguide 2a (from left to right in FIG. 6), and thus the elements of the transformer 100 are described by taking this direction into consideration, so that the words such as "enlarge" or "reduce" will refer to previous waveguide dimensions in the mode propagation direction. However, it is to be understood that the present embodiments may encompass an optical mode travelling in the opposite direction and being input from the second waveguide and being optically coupled to the first waveguide.

As visible from FIG. 6, the overlapping region may be divided in three different sections, separated in the FIG. 6 by the dashed lines referred to as axis "IN", "MIDDLE", "OUT" and "E", respectively, wherein the waveguides 1a, 2a have different shapes. It is to be understood that not all sections are needed and they can be realized to maximise the power transfer efficiency and minimize the overall length of the device. In a first section of length $L_1$ along the Z axis, represented as the region between axes "IN" and "MIDDLE", both first and second waveguides includes a tapered region: the first core 1 includes a tapered region 11 in which its lateral width (i.e., its width in the X direction perpendicular to the Z axis) is reduced from $M_{1IN}$ to $W_{1MIDDLE}$, and the second core 2 includes a tapered region 13 where its lateral width enlarges from $W_{2IN}$ (the tip of the taper) to $W_{2MIDDLE}$. $W_{2IN}$ represents the smallest width of the second waveguide core 2, and coincides with the width of one of the waveguide ends from which the taper extends. From the first section ending at the axis indicated with "MIDDLE", a second section of length $L_2$ along the Z axis extends, in which the first core 1 maintains substantially the same cross sectional area in a constant width section 12, while the second core 2 includes a further tapered region 13' adjacent to the tapered region 13 and being substantially its continuation, further increasing its width up to $W_{2OUT}$.

Preferably, the width $W_{2OUT}$ is comprised between 0.25 µm and 1.50 µm in the first transformer of the invention, and between 0.3 µm and 3.0 µm in the second transformer of the invention.

After this second section ending at the "OUT" axis, an optional third section may further extends, up to the "E" axis, in which both first and second cores 1,2 include a constant width section 14,15 wherein the two cores 1,2 maintain substantially the same cross sectional area. The end of the third section (indicated with the axis "E" in FIG. 6) also represents the end of the first core 1. From that point onwards, only the second core 2 extends further along the Z axis.

The sum of the lengths of the first and second sections $L_1$ and $L_2$ gives the overall length L of the second core tapered region of the transformer 100. Preferably, this length L is comprised between 50 µm and 3000 µm, more preferably between 100 µm to 1000 µm.

Preferably, within the tapered region in the second waveguide core 2 the evanescent coupling takes place, thus at the end of the taper the mode travelling in the transformer inputted in the first waveguide is basically completely coupled to the second waveguide.

Figures 7A, 7B:
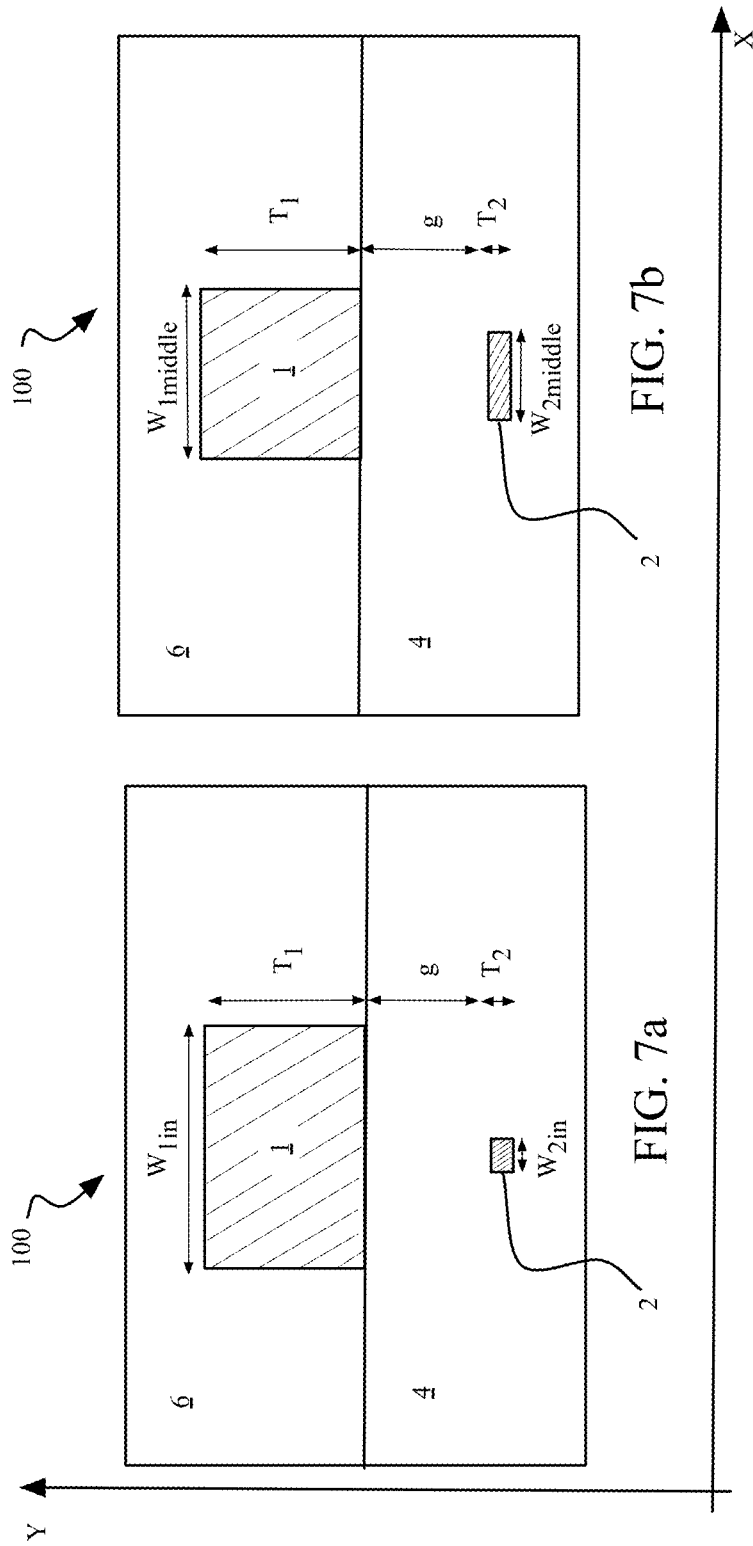
FIGS. 7a and 7b are two lateral cross sections of the transformer of FIG. 1 taken along the dashed lines of FIG. 6.
Figure 9A:
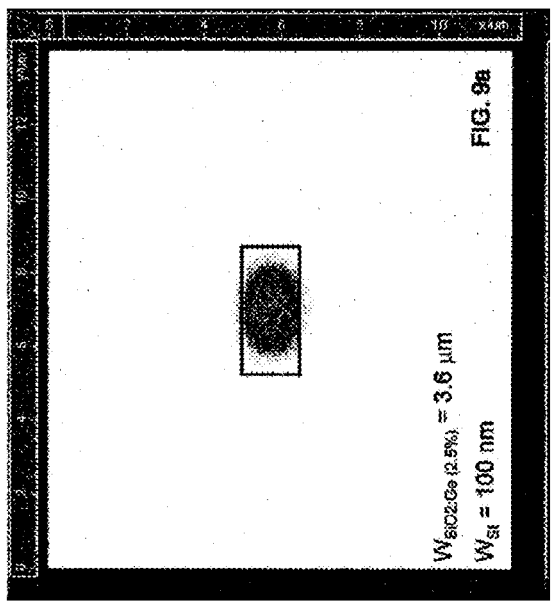
FIGS. 9a-9c are simulations of the behaviour of a TE mode travelling in the transformer of FIG. 1.
Figure 9B:
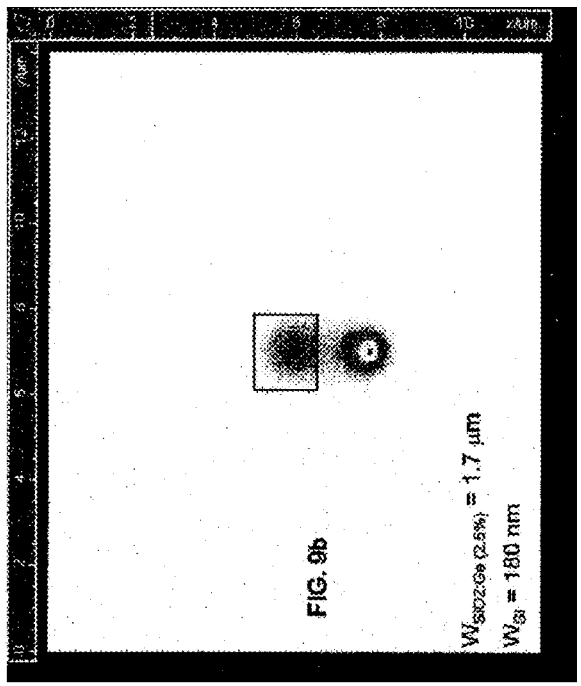
Figure 9C:
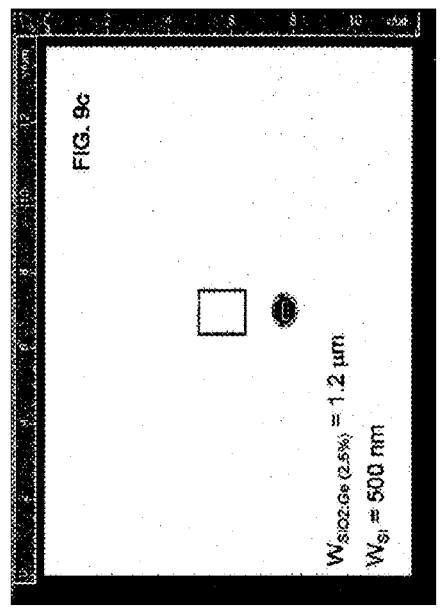

FIGS. 7a and 7b show two lateral cross-sections of the transformer 100 in the (X,Y) plane taken along the two axes indicated with "IN" and "MIDDLE" in FIG. 6, respectively. The first cross section of FIG. 7a shows the second core 2 at its smallest width and the first core 1 at its largest width, i.e., at $W_{2IN}$ and $W_{1IN}$. In the second cross section of FIG. 7b, the second core 2 is represented at its intermediate width $W_{2MIDDLE}$, while the first core 1 is depicted at its smallest width $W_{1MIDDLE}$.

Figure 15:
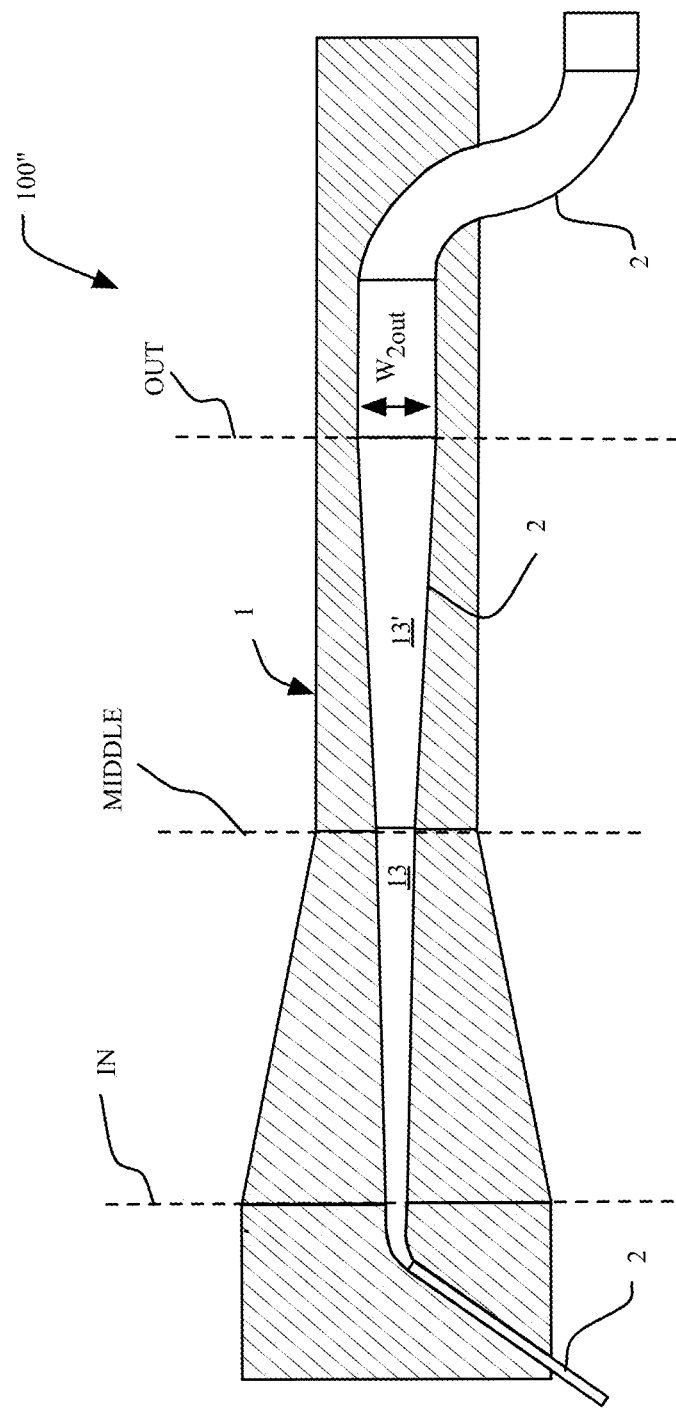
FIG. 15 is a top view of a detail of an additional embodiment of the transformer of FIG. 1.

It is to be understood that FIG. 6 represents only a preferred realization of a coupling region between the two waveguide cores 1,2. Both first and second waveguide cores may for example extend also on both sides of the overlapping region. FIG. 15 shows a top view of the overlapping region of a transformer 100" according to a different embodiment of the present invention. The characteristics of transformer 100" not depicted in FIG. 15 are to be considered identical to those of transformer 100. The first waveguide core 1 of transformer 100" further extends along the Z direction also after the evanescent coupling has taken place. In addition, the second waveguide core 2 does not start at the beginning of the coupling region, e.g., the taper tip is not an end of the second core, but it extends along a direction forming a given angle with the Z direction, for example the angle is chosen in such a way that the tip is adiabatically "pulled away" from the second waveguide so that no significant optical coupling takes place between them. The second and first waveguide cores overlap along the Z-axis when the second core has a minimum cross sectional area, i.e., the overlapping takes place when the second core has the tip cross sectional area. After the coupling region (on the right of FIG. 15), the second core 2 may further bends towards another direction.

In operation, the functioning of the transformer 100 can be understood with the help of numerical simulations of the optical mode at various positions within the mode transformer 100. Simulations of a TM and a TE mode inputted in the first waveguide 1a from the SM fiber 3 and then coupled to the second waveguide 2a are shown in the figures from 8a to 8d (TM mode) and from 9a to 9c (TE mode), to pictorially follow the evolution and coupling of the mode in the transformer 100. The FIGS. 8a (9a) shows the TM (TE) mode at the input of the coupling region, i.e., at the location corresponding to FIG. 7a: the mode is travelling substantially all confined within the first core 1. FIGS. 8b (9b) shows the mode at the "MIDDLE" of the coupling region, corresponding to the cross section of FIG. 7b: the TM (TE) mode is partially transferred to the second core 2, but still a relevant portion of it is guided in the first core 1. At the output of the coupling region, which corresponds to the end of the second section 13', (at axis "OUT") of the first and second core, the mode is substantially all transferred to the second core 2, as shown by FIGS. 8c (9c). FIG. 8d represents a longitudinal cross section of the transformer 100 substantially analogous to a portion of FIG. 1 visualizing the TM mode evolution along the evanescent coupling section.

EXAMPLE 1

A $SiO_2$:Ge first waveguide core, with $n_{first\ core}=1.483$ and $\Delta n_1=2.5\%$ having a square cross section of 2.6 µm×2.6 µm as guiding dimensions outside the coupling region is vertically arranged on top of a 150 nm thick Si waveguide ($n_{second\ core}=3.4756$, $\Delta n_2=40\%$), the two being separated by a 1.2 µm an oxide layer (TEOS) having $n_{cladding}=1.446$ at 1550 nm. First and second core are vertically aligned, i.e., no lateral misalignments exist between the first and the second waveguide. The thicknesses of both cores 1,2 remain substantially unchanged along the transformer 100 and therefore they are not further mentioned.

In this Example, the dimensions of the cores at the first cross section of FIG. 7a are $W_{2IN}=100$ nm=the width of the taper tip realized in the Si waveguide, and $W_{1IN}$=the thickness of the first core=2.6 µm. The first section of the overlapping region has a length $L_1$ equal to 500 µm. At the second cross section of FIG. 7b, the second core 2 has an intermediate width $W_{2MIDDLE}=200$ nm, and the first core 1 is at its smallest width $W_{1MIDDLE}=1.2$ µm, which remains constant till the end of the overlapping region. The tapered region in the Si core terminates with the guiding width $W_{2OUT}=500$ nm that remains constant in the portion of the waveguides that extends after the coupling region. The length $L_2$ of the second section of the overlapping region is again equal to 500 µm, which gives a total length L of the taper in the Si core of 1000 µm.

Figure 14C:
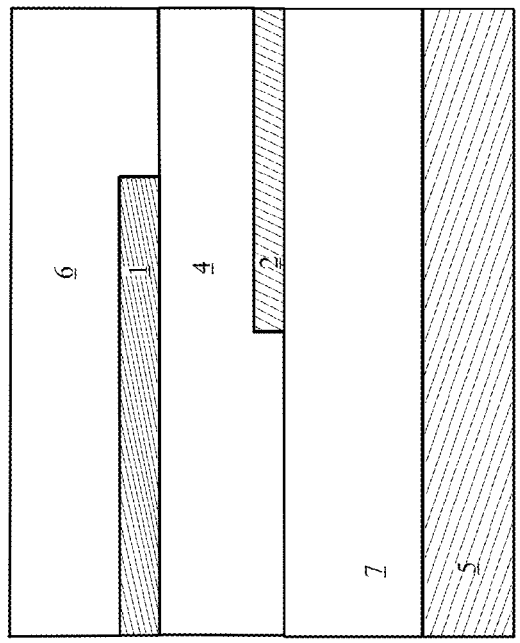
FIGS. 14a-14c show fabrication steps for the realization of the transformer of FIG. 1.
Figure 14A:
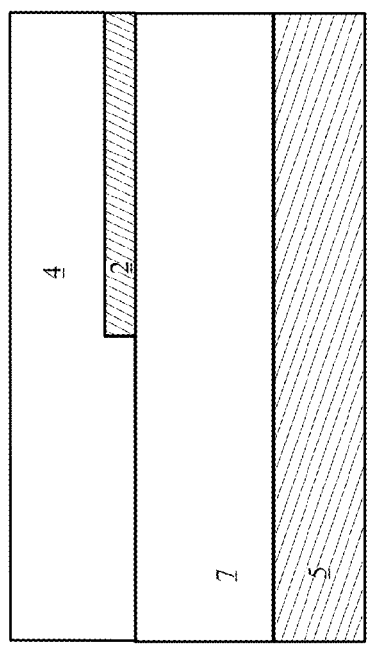
Figure 14B:
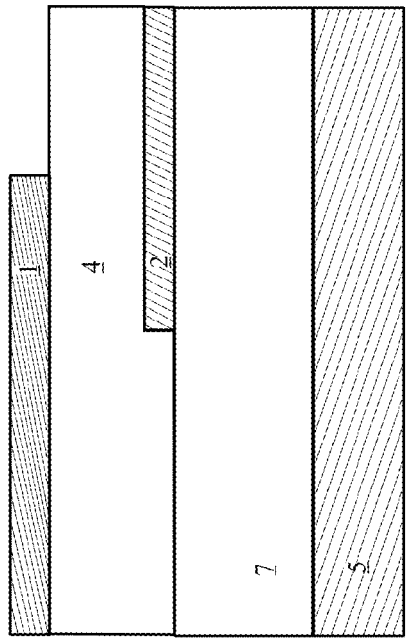

The steps for the realization of the transformer of Example 1 are the following. A commercially available 501 structure includes the substrate wafer 5, the buffer layer 7 (e.g., $SiO_2$), and a top Si layer of 150 nm. The Si film is subsequently patterned by using e-beam lithography. A TEOS (n=1.4389 at 1550 nm) upper cladding layer 4 is deposited above the patterned Si core 2 and the employed technique is Atmospheric Chemical Vapour Deposition (APCVD). The resulting TEOS surface is thus planarized (see FIG. 14a in which this step is shown). A $SiO_2$:Ge layer is then deposited using Plasma Enhanced Chemical Vapor Deposition (PECVD) and etched so as to form the first waveguide core 1 (FIG. 14b). In this etching step, optical lithography is preferred to pattern the top waveguide core 1 due to its relatively large spatial extensions which would require very long exposure time if e-beam lithography were used. A BP-TEOS top cladding 6 is then deposited to bury the first waveguide core 1 (see FIG. 14c).

Figure 4B:
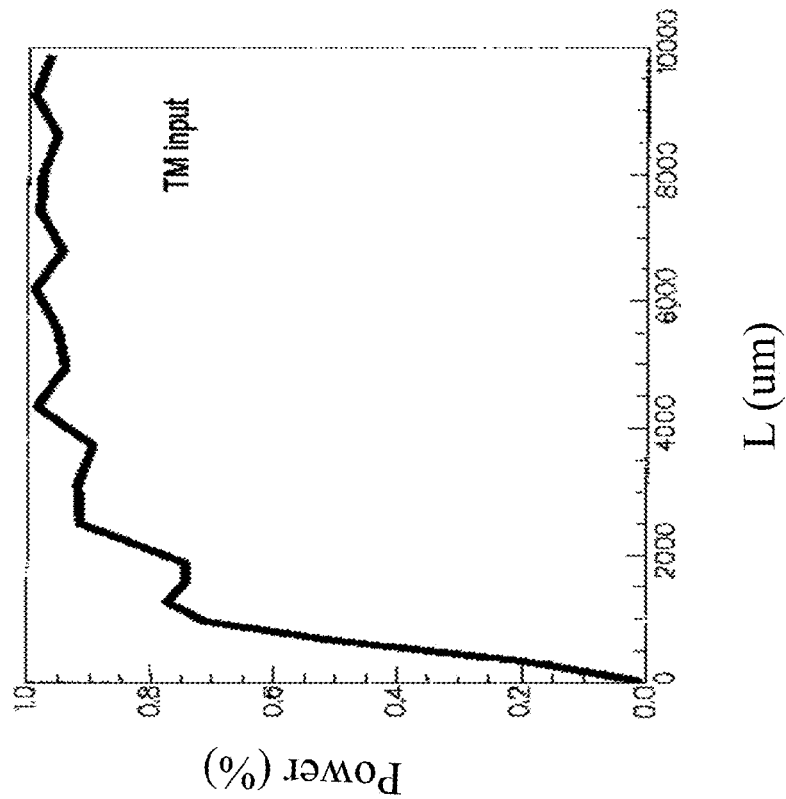
FIGS. 4a and 4b are graphs showing the behaviour of the normalized power transfer of the TE and TM polarization modes as input signals in the mode transformer of FIG. 3 as a function of the coupling region length L.
Figure 4A:
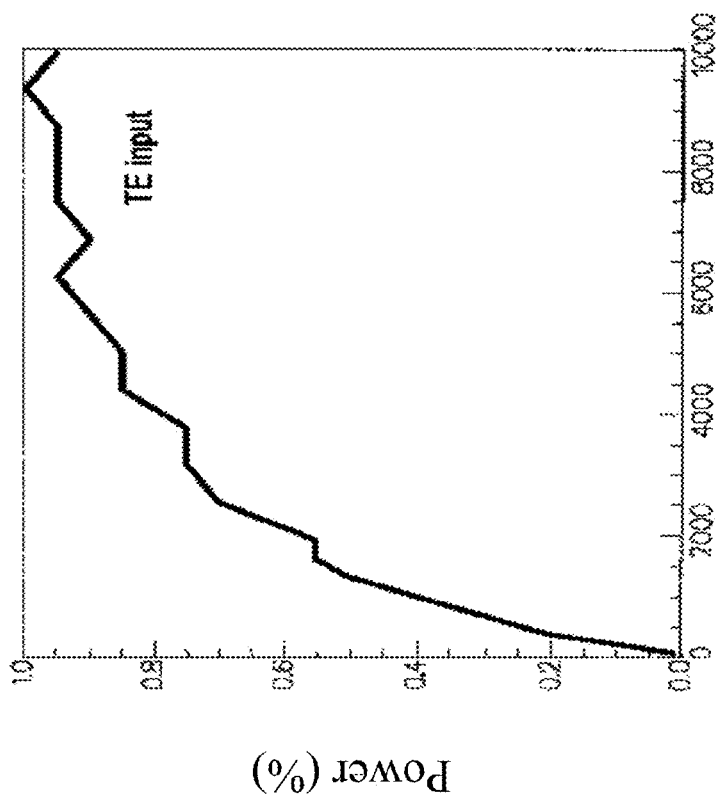
Figure 5:
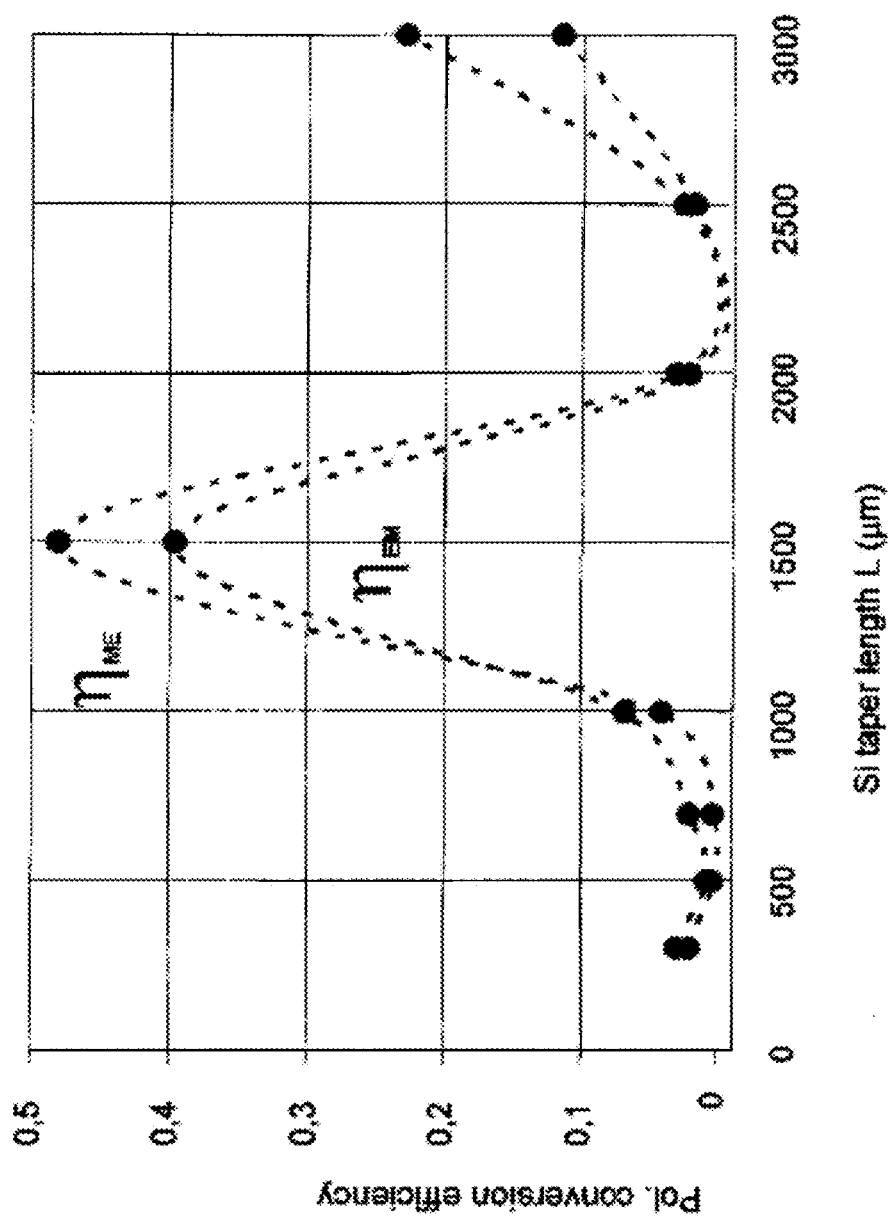
FIG. 5 is a graph showing the polarization conversion efficiency versus the Si taper length of the mode transformer of FIG. 2.
Figures 10A, 10B:
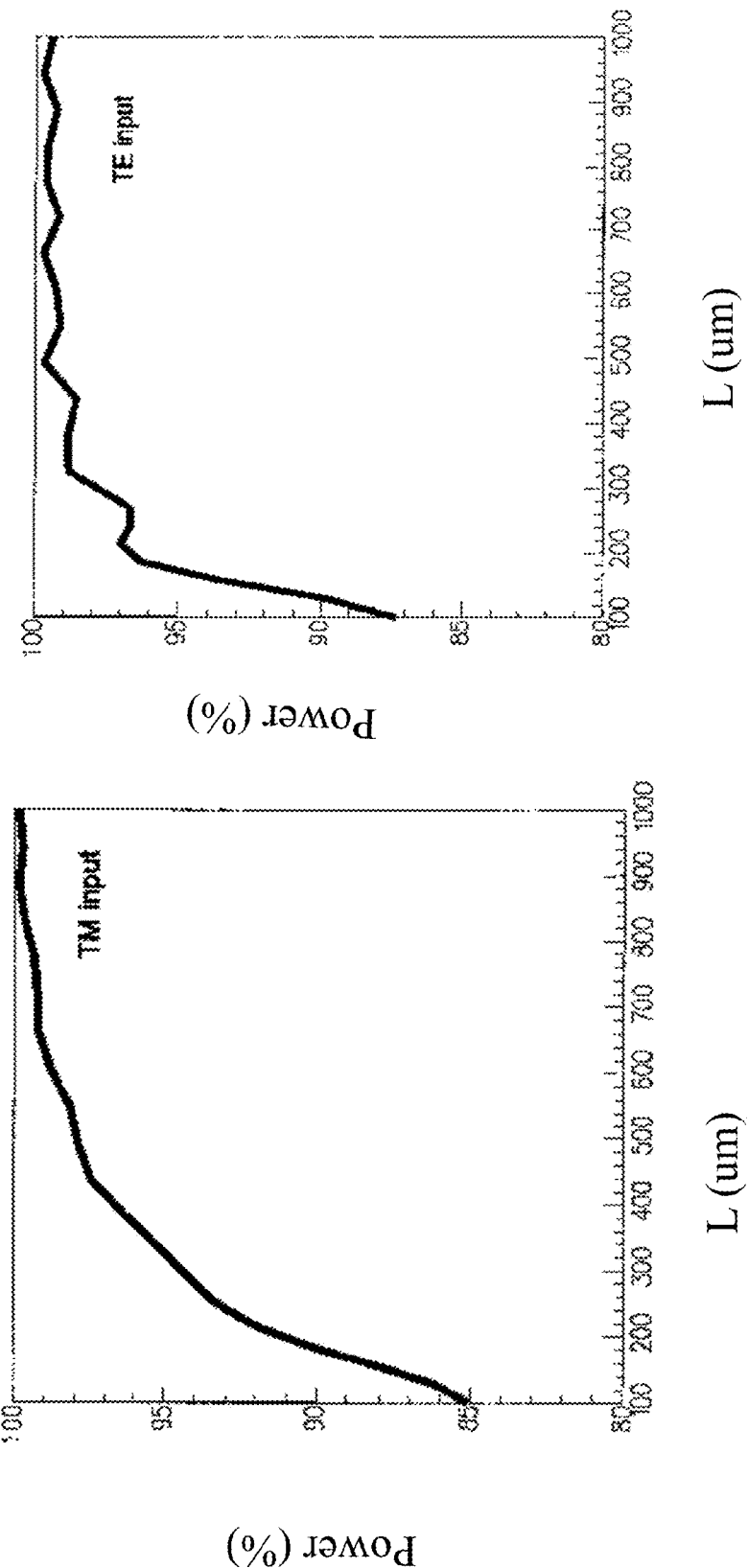
FIGS. 10a and 10b are graphs showing the behaviour of the normalized power transfer of the TM and TE polarization mode as input signals in the mode transformer of FIG. 1 as a function of the taper length of the second waveguide core.

The coupling efficiency of the transformer 100 according to Example 1 is shown in the graphs of FIGS. 10a and 10b, which correspond to the graphs of FIGS. 4a and 4b realized for the transformer of FIG. 3, in which the normalized power transfer of a TM/TE mode (FIG. 10a and FIG. 10b, respectively) inputted in the first waveguide 1a and coupled into the second waveguide 2a is shown versus the length L of the coupling region (tapered region) realized in the Si core. Each graph represent the percentage of TE(TM) mode power present in the second waveguide core. From the two figures, it can be deduced that both TE and TM polarizations are efficiently transferred from the first to the second waveguide core: already with a taper length of 500 µm, more than 95% of the TE and TM polarization modes power is transferred to the Si core.

Figure 11:
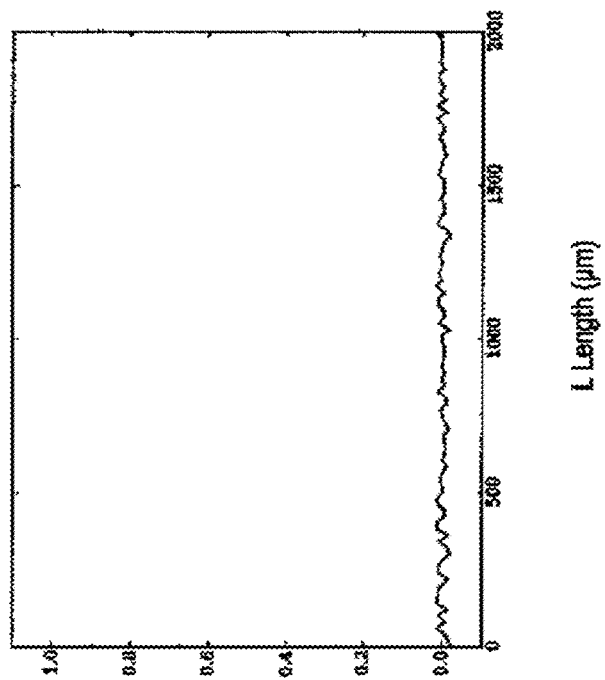
FIG. 11 is a graph of the polarization conversion efficiency versus the taper length of the second waveguide core for the transformer of FIG. 1.

Additionally, the transformer 100 according to Example 1 is polarization-preserving, as clearly shown in the graph of FIG. 11. The polarization conversion efficiency of the transformer 100 is substantially equal to zero, i.e., inputted TM modes remain TM modes at the transformer output and inputted TE modes result in TE modes, for any taper length L.

EXAMPLE 2

A transformer identical to the transformer of Example 1, with the exception of the first core dimensions, has been realized by the Applicants.

In detail, referring back to FIGS. 7a and 7b, the dimensions of the cores of the transformer in this Example 2 are the following. The guiding portion of the first waveguide core 1 has a constant cross section of 3.6 µm×1.5 µm, leading therefore to an input width at the cross section represented in FIG. 7a of $W_{1IN}=3.6$ µm for the first waveguide, while the width of the second waveguide core is, as in Example 1, $W_{2IN}=100$ nm. The gap g between the two cores is still of 1.2 µm. At the end of the first section, having $L_1$ equal to 500 µm, i.e., at the position depicted in the second cross section of FIG. 7b, the second core 2 has an intermediate width $W_{2MIDDLE}$=200 nm, and the first core 1 is at its smallest width $W_{1MIDDLE}$=1.2 m, which remains constant till the end of the overlapping region. At the output, i.e., at the end of the second section having $L_2$=500 μm, the Si core taper 13' terminates with the guiding width $W_{2OUT}$=500 nm that remains constant outside the coupling region, while $W_{1OUT}$=1.2 μm.

The simulated performances of the transformer realized according to this second Example do not differ substantially from the ones of the transformer 100 realized according to Example 1.

Figure 13A:
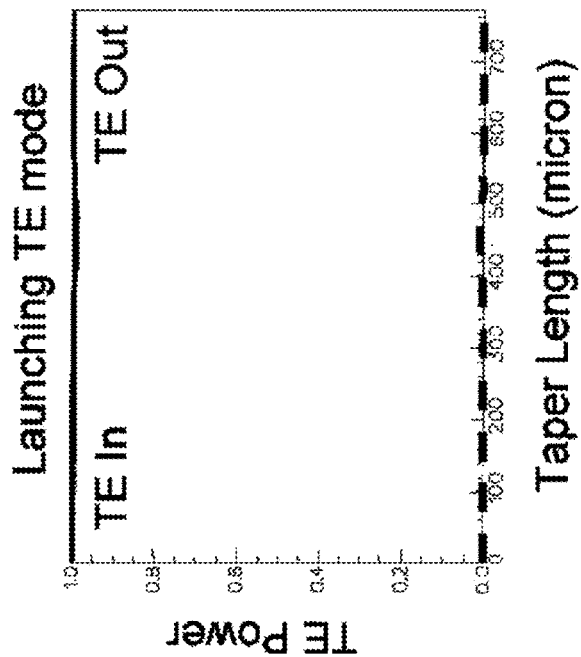
FIGS. 13a and 13b are graphs showing the TE/TM power vs. the taper length for TE/TM modes inputted in the transformer of FIG. 1.

If the two waveguides 1a, 2a are aligned, as in the above mentioned Example 2, no power exchange takes place between TE and TM as it is shown in the graphs depicted in FIGS. 13a (TE) and 13b (TM), so that the same launched polarization state (TE/TM) will appear at the end of the taper region for any taper length. The two graphs of FIGS. 13a, 13b will be better described below with reference to the following Example 3.

Applicants have shown that for misalignments up to 2 μm, i.e., for distances between the first and the second waveguide axis in the direction perpendicular to the mode propagating direction up to 2 μm, the performances of the transformer of the invention do not changes substantially. However for such misalignments some polarization mixing may happen, due to the broken symmetry in the cross sectional plane.

EXAMPLE 3

Figure 12:
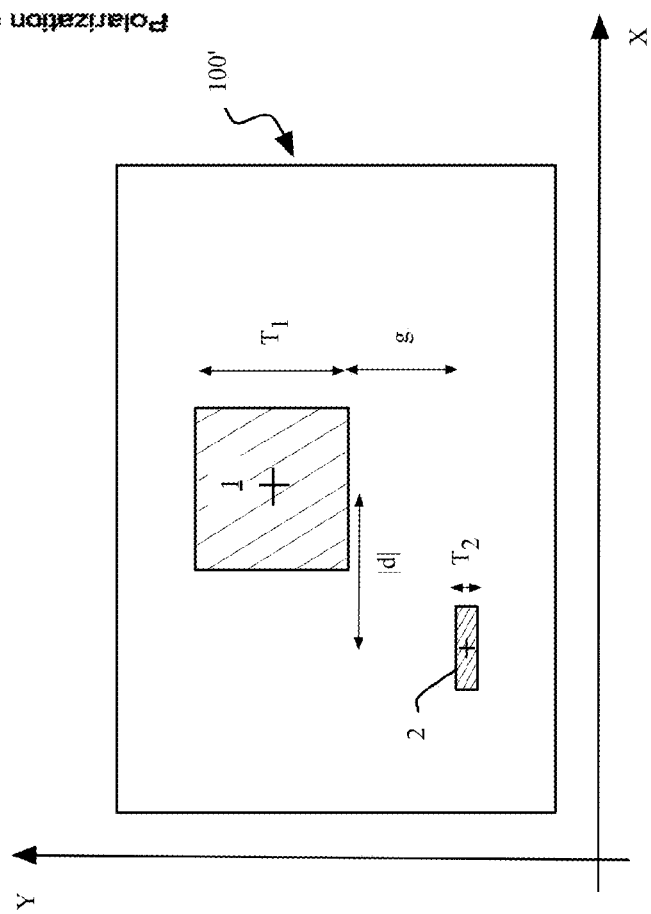
FIG. 12 is a lateral cross sectional view of a variant of the transformer of FIG. 1.

The same structure of Example 1 has been realized (same materials and waveguide dimensions), however first and second waveguide have 1 μm lateral misalignment. This embodiment is shown in the cross section FIG. 12, where the geometrical axes of the first and second waveguide core are schematically identified with a dot. The transformer according to this Example is globally indicated with 100'. A 1 μm lateral misalignment stands for a distance along the X direction between the two waveguides core axes of d=1 μm.

According to the performed numerical simulations, Applicants have observed that polarization mixing takes place to a minor extent in the transformer 100' realized according to Example 3. The observed polarization coupling is limited to the amount of 20% and it is reversible, i.e., after a given propagating distance within the first waveguide, the polarization state of the travelling mode "returns" to the input polarization. At the output of the taper of the second waveguide core, the same polarization launched in the first waveguide will therefore appear. In addition, polarization mixing takes place mainly in the first waveguide, so that its impact on Polarization Dependent Loss and Polarization Mode Dispersion is substantially negligible.

Figure 13B:
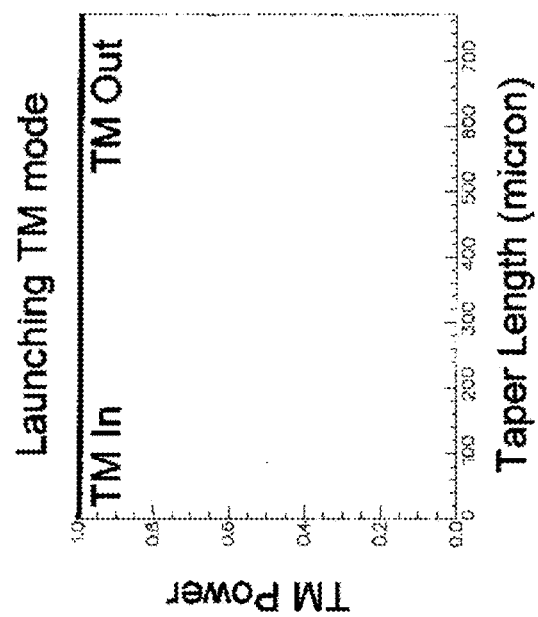
Figure 16A:
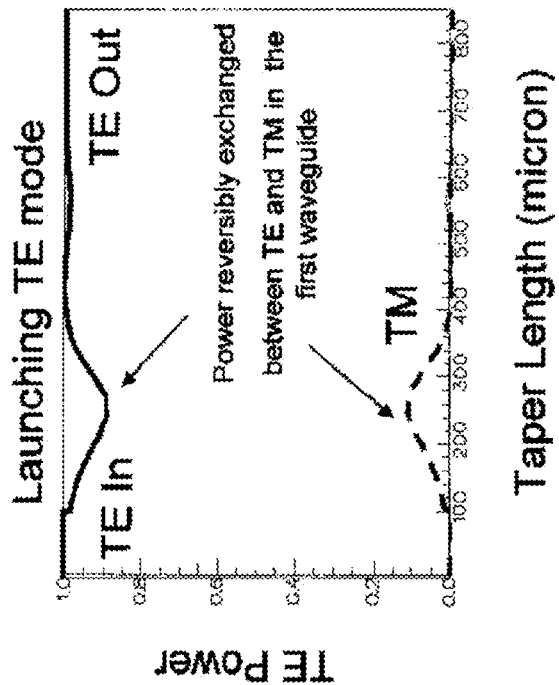
FIGS. 16a and 16b are graphs analogous to FIGS. 13a and 13b for a different embodiment of the transformer of FIG. 1.
Figure 16B:
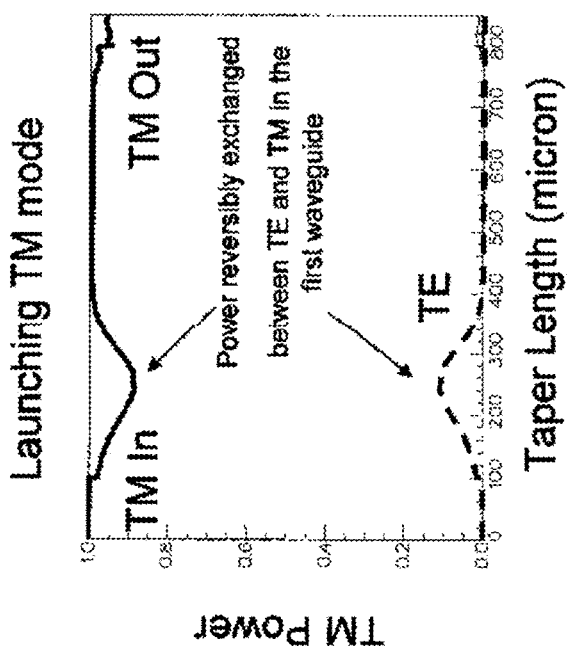

This effect is visible in FIGS. 16a and 16b, analogous to FIGS. 13a and 13b described with reference to Example 2: there is some polarization mixing which takes place in the first waveguide (in the graphs of FIGS. 16a, 16b, the power transfer between the two polarization modes is identified by the "bumps" of the curves), however the polarization state of the travelling mode at the end of the coupling region returns substantially identical to the inputted one. By comparison, in the aligned configuration of Example 1 or 2 depicted in FIGS. 13a, 13b, such "bumps" are not present, i.e., there is no power exchange between the polarization states.

The transformers according to the present invention can be integrated in several integrated optical devices or sub-systems, such as tunable optical add drop multiplexers, tunable optical filters, modulators, grating filters, sensors, etc.

The invention claimed is:

1. An optical mode transformer comprising:
   a first waveguide extending along a first main longitudinal direction and including an end facet configured to be coupled to an optical fiber, the first waveguide including a first core and a first cladding, and having a first refractive index contrast; and
   a second waveguide being arranged with respect to the first waveguide so as to realize an evanescent optical coupling with the first waveguide, the second waveguide comprising a second core and a second cladding, and having a second refractive index contrast, the second core including a tapered region in at least a portion of which the evanescent coupling takes place; and
   wherein the first core and the second core are separated by a gap, the first refractive index contrast is less than the second refractive index contrast and the second refractive index contrast is not less than 18%.

2. The mode transformer according to claim 1, wherein a thickness of the second core is greater than or equal to 120 nm and less than or equal to 180 nm and the second refractive index contrast is not less than 40%.

3. The mode transformer according to claim 2, wherein the gap between the first and the second core is between 0.1 um and 3 um.

4. The mode transformer according to claim 1, wherein a thickness of the second core is greater than or equal to 100 nm and less than or equal to 400 nm and the second refractive index contrast is between 18% and 30%.

5. The mode transformer according to claim 4, wherein the gap between the first and the second core is between 0.1 μm and 5 μm.

6. The mode transformer according to claim 4, wherein the second core comprises a wide bandgap semiconductor.

7. The mode transformer according to claim 1, wherein the gap has a substantially uniform height.

8. The mode transformer according to claim 1, wherein the first core comprises a tapered region in at least a portion of which the evanescent coupling takes place with the second waveguide.

9. The mode transformer according to claim 8, wherein the tapered region of the first core includes a linear taper profile.

10. The mode transformer according to claim 8, wherein the tapered region of the first core includes an exponential taper profile.

11. The mode transformer according to claim 8, wherein the tapered region of the first core includes a parabolic taper profile.

12. The mode transformer according to claim 1, wherein the tapered region of the second core includes a linear taper profile.

13. The mode transformer according to claim 1, wherein the tapered region of the second core includes an exponential taper profile.

14. The mode transformer according to claim 1, wherein the tapered region of the second core includes a parabolic taper profile.

15. The mode transformer according to claim 1, wherein the first core and the second core at least partially overlap along the first main longitudinal direction to form an overlapping region.

16. The mode transformer according to claim 15 wherein a cross-section of the second core is not substantially square in at least a portion of the overlapping region, the cross-section being taken perpendicular to the first main longitudinal direction.

17. The mode transformer according to claim 15, wherein a tapered region of the first core and at least a portion of the tapered region of the second core are disposed within the overlapping region.

18. The mode transformer according to claim 17, wherein a constant width section of the first core is additionally disposed within the overlapping region.

19. The mode transformer according to claim 17, wherein a constant width section of the second core is additionally disposed within the overlapping region.

20. The mode transformer according to claim 15, wherein the first core and the second core extend into an adiabatic region outside of the overlapping region, the first core angled to the second core in the adiabatic region to substantially eliminate optical coupling therebetween.

* * * * *